(12) United States Patent
Anfiteatro et al.

(10) Patent No.: US 10,724,923 B2
(45) Date of Patent: Jul. 28, 2020

(54) EVAPORATIVE EMISSIONS CONTROL SYSTEMS TESTING DEVICE

(71) Applicant: Hudson View Labs Inc., Croton-on-Hudson, NY (US)

(72) Inventors: Adam Anfiteatro, Croton-on-Hudson, NY (US); Michael T. Kivisalu, Croton-on-Hudson, NY (US)

(73) Assignee: HUDSON VIEW LABS INC., Croton-on-Hudson, NY (US)

( * ) Notice: Subject to any disclaimer, the term of this patent is extended or adjusted under 35 U.S.C. 154(b) by 259 days.

(21) Appl. No.: 15/983,679

(22) Filed: May 18, 2018

(65) Prior Publication Data

US 2018/0335367 A1 Nov. 22, 2018

Related U.S. Application Data

(60) Provisional application No. 62/508,564, filed on May 19, 2017.

(51) Int. Cl.
*G01M 15/04* (2006.01)
*G01M 3/32* (2006.01)
(Continued)

(52) U.S. Cl.
CPC ........ *G01M 15/042* (2013.01); *G01M 3/2815* (2013.01); *G01M 3/3272* (2013.01); *F02M 25/0818* (2013.01)

(58) Field of Classification Search
CPC .... G01M 15/042; G01M 15/00; G01M 15/04; G01M 15/048; G01M 15/05; G01M 15/08; G01M 15/09; G01M 15/10; G01M 15/11; G01M 15/102; G01M 15/106; G01M 15/14; G01M 7/00; G01M 3/2815; G01M 3/3272; G01M 3/3263; G01M 3/329; G01L 23/24; G01L 23/20; G01L 23/18; F02M 25/0818; F02M 25/0809; F02M 65/00; F02M 35/1038; F02D 41/0032; F02D 41/0045; F02D 41/448; F02D 19/0634; F02D 19/0636; F02D 19/0639; F02D 19/0628; F02D 19/0631; F02D 2200/0602; F02D 2200/0408; F02D 2041/224; F02D 41/1444; F02D 41/22; F01M 2011/1446; F16N 2250/04; B60W 2710/0616;
(Continued)

(56) References Cited

U.S. PATENT DOCUMENTS

| | | | | |
|---|---|---|---|---|
| 4,816,045 A | * | 3/1989 | Szlaga | B60K 15/04 96/164 |
| 2006/0249126 A1 | * | 11/2006 | Hurley | F02M 25/0809 123/520 |

* cited by examiner

*Primary Examiner* — Harshad R Patel
*Assistant Examiner* — Nigel H Plumb
(74) *Attorney, Agent, or Firm* — Donald J. Ranft; Collen

(57) ABSTRACT

An Evaporative Emission Control System (EVAP) testing device using a control unit connected to a gas cap vehicle interface unit. The gas cap vehicle interface unit is configured to match the required threading for the gas tank receptacle on a vehicle and has a pressure bypass port. The pressure bypass tube or channel extends through the gas cap vehicle interface unit to a pressure sensor module in the control unit. The control unit includes electronics needed to capture and transmit the pressure typically using a wireless transmission component. The control unit also includes a power switch and power indicating light. The control unit and gas cap vehicle interface unit can be combined into one unit or separate units designed to be connected to each other.

13 Claims, 6 Drawing Sheets

(51) Int. Cl.
*G01M 3/28* (2006.01)
*F02M 25/08* (2006.01)

(58) Field of Classification Search
CPC .............. B60W 2710/06; F01N 11/007; F01N 2560/02; F01N 2900/1402
See application file for complete search history.

EVAPORATIVE EMISSIONS CONTROL SYSTEMS TESTING DEVICE

CROSS-REFERENCE TO RELATED APPLICATIONS

The present application claims priority to U.S. Provisional Patent Application Ser. No. 62/508,564 filed May 19, 2017 and entitled "GAS CAP TESTING DEVICE" which is hereby incorporated herein by reference in entirety for all purposes.

TECHNICAL FIELD

Embodiments of the present disclosure generally relate to Evaporative Emissions Control Systems (EVAP) testing for automotive vehicles, and, more specifically, to EVAP faults, namely leaks, their detection, diagnosis, repair, and repair confirmation.

BACKGROUND OF INVENTION

In the automotive repair industry, Evaporative Emission Control System (EVAP) leaks are difficult to diagnose using on board computer diagnostic tools as the reported error codes cannot directly identify what kind of EVAP leak is present. This requires the use of further diagnostic tools and techniques to determine the details of the reported error codes. Further time consuming methods are required to evaluate if any fixes made have properly fixed the car's EVAP system.

Modern day cars' EVAP system run self-tests during standard operation. These same tests are used by the car's internal systems to produce the previously mentioned error codes. During these tests the system pulls a vacuum or performs a pressure test on the fuel system. A leak is determined to be present if the airflow recorded by the internal test exceeds the expected amount. When a leak is found this causes the check engine light to illuminate and saves an error code. The saved error codes remain present on the car's computer and do not specify what kind of leak is present.

Once a leak error code is found, there are a number of methods and devices available to locate an EVAP leak and determine what kind of leak it is. An example of such a device is an EVAP smoke machine. This device produces smoke that fills the entire system with smoke. If there are any leaks, smoke will begin to leak out of the openings. This allows the automotive technician to then fix any found leak. This process is repeated until smoke cannot be seen coming out of the EVAP system.

This procedure can be very labor intensive and requires the vehicle being diagnosed to be stationary in a controlled environment. The automotive technician diagnosing the error codes could spend a great deal of time searching for the leak. While doing this he is decreasing the efficiency of the automotive repair shop as a whole as the vehicle being diagnosed is taking up diagnostic space in the automotive repair shop.

Once all of the leaks are successfully found and the automotive technician has fixed the issues, there is no immediate way for the automotive technician to check to see if the EVAP system is operating properly. One way to check the work done on the EVAP system is to check the car's computer with the diagnostic tools. Unfortunately, as the system monitor does not pass the EVAP system until a number of drive cycles have been completed, the automotive technician must take the car out for a test drive. This single test drive might not even be enough to validate his repair on the EVAP system as there is no standardized method shared between all types of automobiles. If the monitor does not pass the EVAP system the automotive technician must begin the process of diagnosing the car again. This can take many trips and waste valuable time and space solving this issue. The inefficiencies in diagnosing and checking performed work when testing for car EVAP system leaks calls for an alternative solution to be developed.

One proposed solution is to take advantage of EVAP system self-tests that any modern car runs during operation. A secondary device can be used to record data during the self-tests that would allow for immediate checking of work and quick determination if EVAP leaks exist.

Even though it is mandated that modern cars possess EVAP detection modules and testing procedures that occur during standard operation, the info needed to diagnose specific EVAP leak issues is lacking. The EVAP test itself tests to see if a vacuum can be held by the fuel tank for some amount of time. These self-tests can determine if a leak is present but not what kind of leak. Moreover, once a leak is determined to exist, working to ensure the maintenance done has properly repaired the EVAP system is a time consuming task. The reason this task is time consuming is that the system monitor will not pass the EVAP system until the automotive technician has repeatedly test driven the vehicle. This system monitor also does have a defined standard as to how to ensure the EVAP system has passed. The required testing can vary from a few test drives in one day to a number of test drives along with the vehicle being left overnight for a few days.

As the method to validate repair work done to an automobile's EVAP system mentioned above is both time consuming and unpredictable, the proposed device acts a solution to this problem. The device allows for the automotive technician to immediately recognize if the automobile's EVAP system is capable of holding a vacuum through the means of a pressure sensor recording gas tank pressures through a pressure transfer tube found in the gas cap vehicle interface.

BRIEF SUMMARY OF THE INVENTION

The proposed device takes full advantage of the EVAP system self-tests by checking if a vacuum has been created and held during standard car operation through the use of a control unit with a pressure sensor. This control unit is capable of recording the pressure present in the gas tank during the EVAP system self-tests through a physical interface connection between the control unit and a compatible car gas cap vehicle interface unit.

A compatible car gas cap vehicle interface unit has a defined industry standard diameter and is designed to connect to the control unit utilizing a clipping mechanism for example but other means are readily available to those skilled in the field. These gas cap vehicle interface units include a mechanism to transfer the gas tank pressure to the control unit without interfering with the integrity of the gas cap vehicle interface unit's pressure release valve. The gas cap vehicle interface units also includes a mechanism to interface with the control unit such as holes compatible with control unit rotation pins. The pressure transfer tube connects the pressure bypass port to the pressure sensor allowing for the gas tank pressures to be recorded. Once a compatible gas cap interface unit is attached to the control unit the entire system can be interfaced with the car being tested. This is done by screwing on the system as you would a standard gas cap. The system then remains on the car during the duration of the testing period.

During the testing period the proposed battery powered device records the existing pressure within the gas tank. This recorded data is transmitted via a wireless connection to an compatible device whether that be a phone, tablet, laptop, computer etc. The recorded data is saved to the connected device and allows for the automotive tech to review the data immediately check to see if the EVAP system is working properly without the need of performing multiple test drives to ensure the system monitor has passed the EVAP system. As this EVAP testing device interfaces directly with the cars gas tank and can measure it's pressure, the device can be used in either the controlled environment of the automotive repair shop by manually inducing a vacuum or on the road of during a road test. This amount of versatility greatly increases the efficiency of diagnosing, treating and confirming EVAP system leak issues.

PARTS LIST

Figure 1:
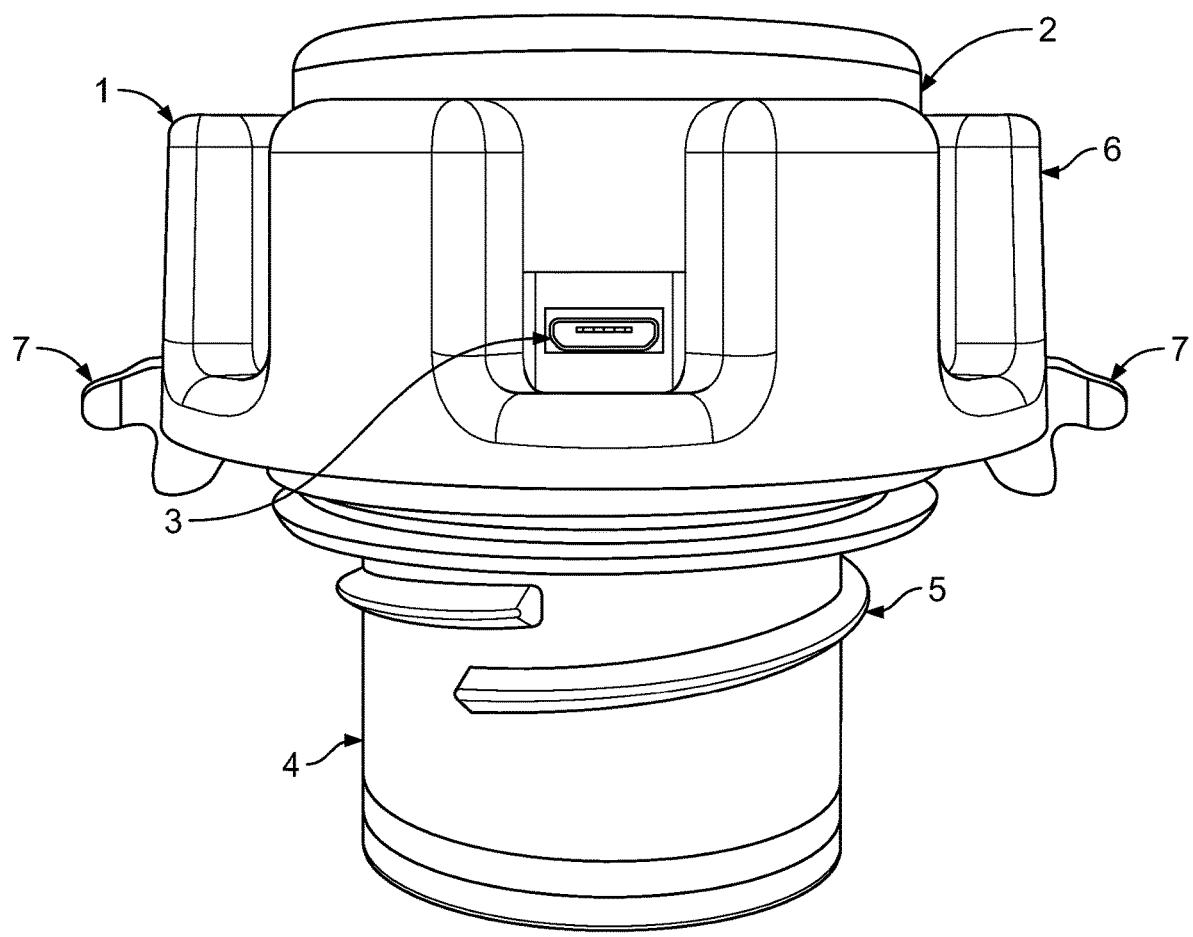
FIG. 1 is an isometric view of the device connected to a compatible gas cap vehicle interface. The compatible gas cap vehicle interface is recessed into the control unit and held in place by the retention clips.

1. Control unit
2. Transparent acrylic top layer
3. Onboard charging port
4. Compatible gas cap vehicle interface unit
5. Singular thread type
6. Control unit housing grips
7. Retention clips
8. Rotation pins
9. Pressure sensor intake opening
10. Control unit lower housing plate
11. Interface cavity
12. Pressure transfer tube/channel
13. Pressure transfer tube cavity
14. Rotation pin mating holes
15. Emergency pressure release valve
16. Airtight seal
17. Pressure bypass port
18. Elapsed test time (NOTE: parts 18-22 are pertaining to the included software)
19. Maximum pressure
20. Number of test samples
21. Minimum pressure
22. View window
23. Wiring between lower control unit housing and upper control unit housing
24. Rechargeable battery
25. Wireless module
26. Pressure sensor module
27. Primary control board
28. Upper control unit housing

DETAILED DESCRIPTION OF THE INVENTION

The following is a detailed description of the EVAP testing device as shown on the figures. It should be noted that in addition to the embodiments disclosed other embodiments are possible to be created by those skilled in this field. This description by no means limits the scope of the proposed device.

FIG. 1 depicts an isometric view of the device as a whole where the control unit 1 and the compatible gas cap vehicle interface unit 4 are connected via the retention clips 7. Many other methods to secure the control unit to the gas cap vehicle interface unit are readily available for use by those skilled in the field. For example the gas cap vehicle interface unit could be designed to be screwed into the control unit. Other examples are using screws, or hook and loop materials to secure one unit to the other one.

At the beginning of operation the automotive technician powers on the device and waits for a status signal that can be seen through the transparent acrylic top layer 2. The signal shown is in the form of a light such as an LED notifying to the automotive technician the device is powered on and ready to be paired to a compatible device via a wireless connection using a provided software. With the device successfully paired with the desired device the automotive technician can install the device on the automobile.

As each make and model of car differ they will have different number of gas cap thread types. The gas cap vehicle interface unit 4 shown has a singular thread type 5 but is just one example of the number of compatible gas cap vehicle interfaces available to be used with the device. Gas cap vehicle interface units 4 are designed as needed to be compatible with any vehicle. The control unit 1 is designed to interface with any number of gas cap interface units given they possess a factory standard interfacing diameter. With EVAP testing device in hand the automotive technician can proceed to screw on the device with the assistance of the control unit grips 6. The gas tank pressures are then recorded and transmitted wirelessly via Bluetooth for example to the connected device. Once the testing is completed the automotive technician can unscrew the EVAP testing device, replace the original gas cap on the car and insert a micro usb charging cable into the onboard charging port 3 to charge the EVAP testing device.

Figure 2:
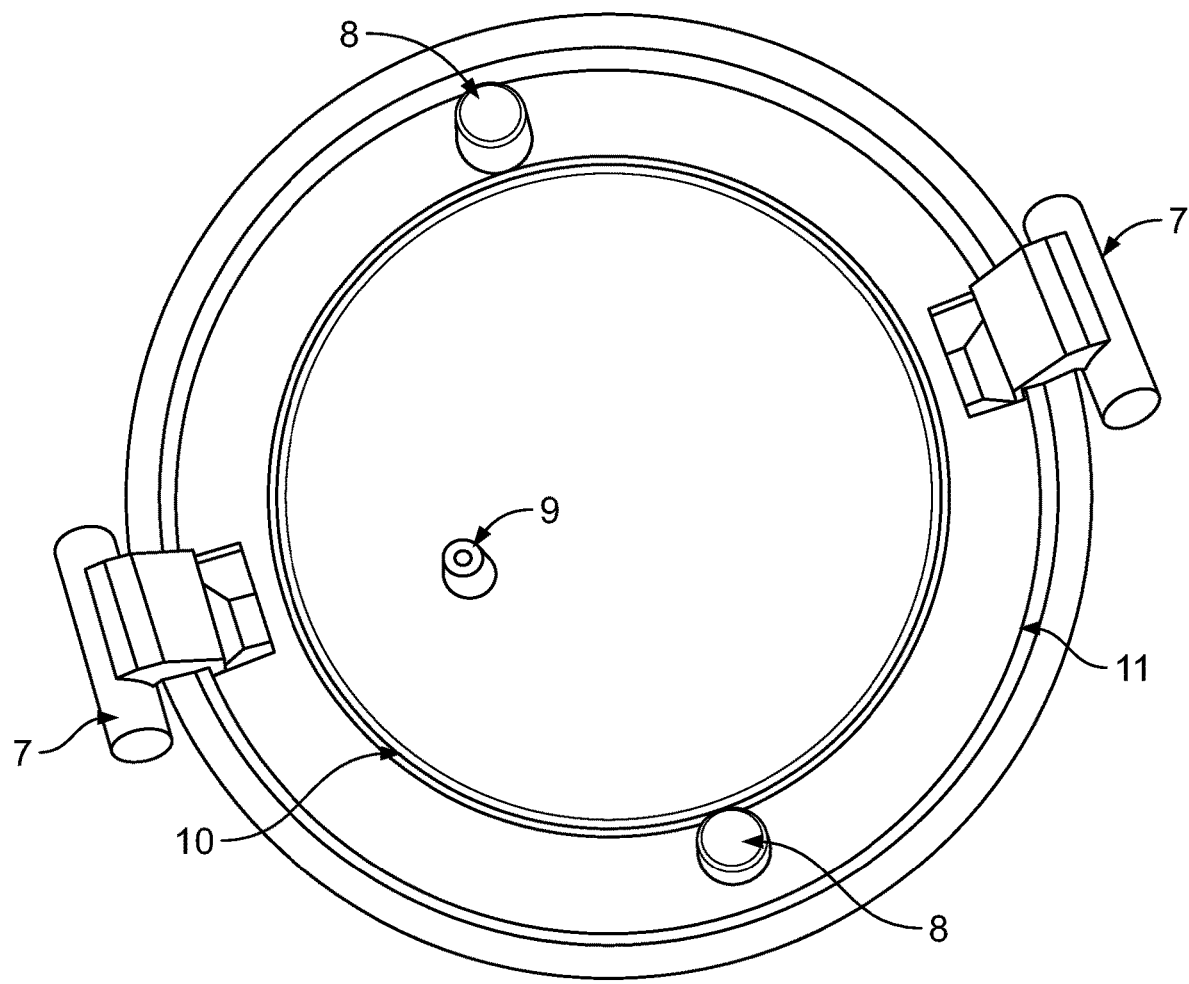
FIG. 2 is a view of the device's underside showing the pressure sensor intake opening, the rotation pins, the lower housing plate, and the retention clips.

FIG. 2 shows the underside of the control unit including the pressure sensor intake opening 9. This intake opening 9 connects to the pressure transfer tube 12. This pressure transfer tube then connects to a pressure bypass port 17 found on the compatible gas cap vehicle interface to allow for the reading of gas tank pressures. The electronics components required to allow the device to function is held within the control unit by the control unit lower housing plate 10. This plate 10 may be designed with a press fit relation with the control unit ensuring that the electronics stay within the control unit.

The EVAP testing device device is meant to screw into a gas tank receptacle, but the retention clips 7 do not provide the support to allow for twisting. As such, rotation pins 8 are included to mesh with the compatible gas cap vehicle interface to allow for turning of the device. These rotation pins 8 recess into rotation pin mating holes 14 in the compatible gas cap vehicle interface. The rotation pins 8 can be created a loose fit relation when the compatible gas cap vehicle interface is fitted into the interface cavity 11 of the control unit 1. In another embodiment the retain clips 7 are designed to provide sufficient support to allow screwing the EVAP testing device into a gas tank receptacle.

The compatible gas cap vehicle interface unit 4 and the interface cavity 11 share a loose fit relation which allows for it to seat properly when inserted. As the compatible gas cap vehicle interface unit 4 is inserted into the interface cavity 11, the retention clips 7 are pushed away from their resting position. The design of the retention clip 7 allows for elastic deformation. Once the compatible gas cap vehicle interface unit 4 is flush with the underside of the control unit 1, the retention clips 7 snap back into their resting position holding the compatible gas cap vehicle interface unit 4 in place.

Figure 3:
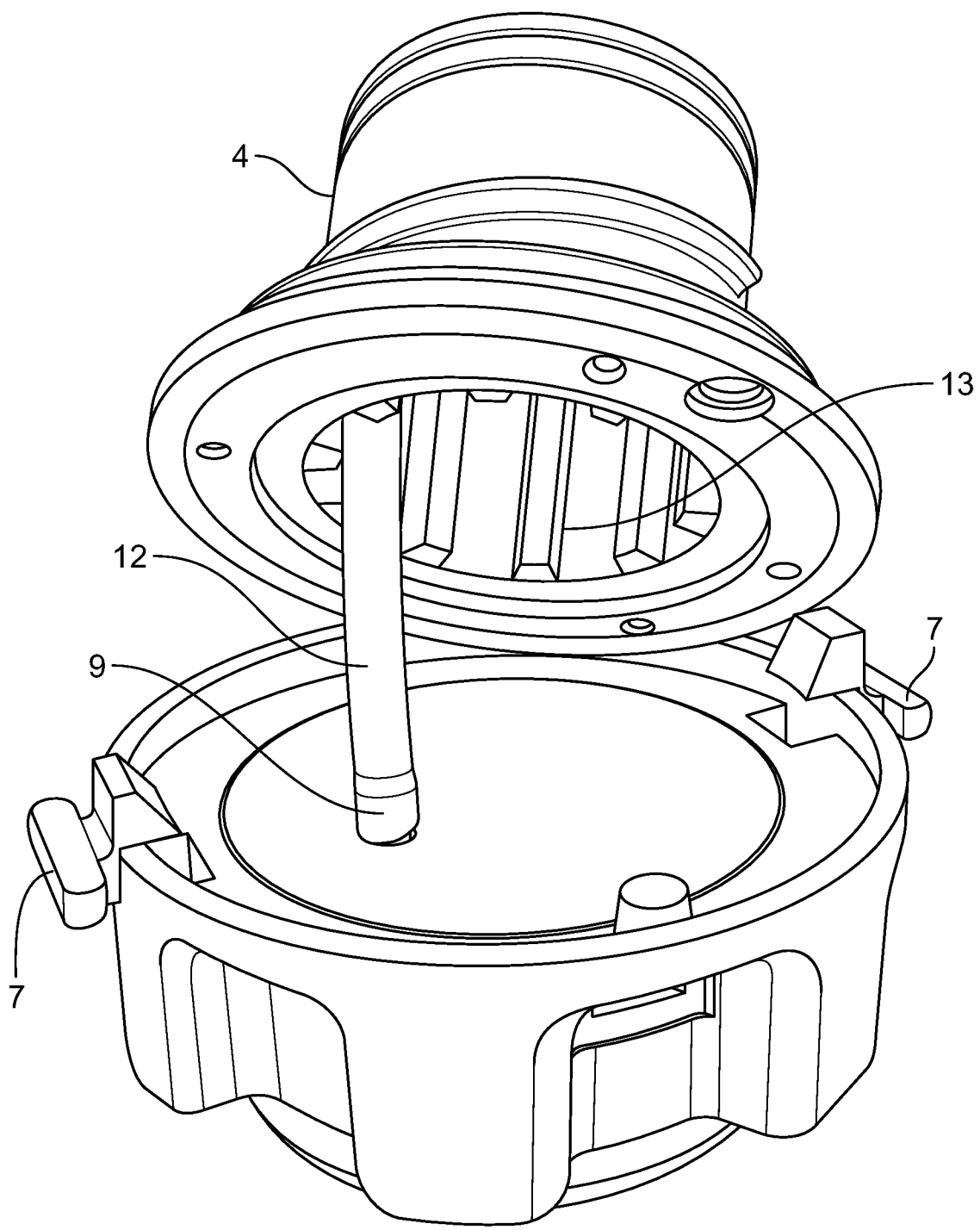
FIG. 3 is a view of the pressure transfer tube connection between the compatible gas cap vehicle interface and the control unit.

FIG. 3 depicts the EVAP testing device with the only connection between the control unit 1 and the compatible gas cap vehicle interface unit 4 being the pressure transfer tube 12. This pressure transfer tube 12 connected to the pressure bypass port allows the transfer of pressure from the vehicle gas tank to the control unit 1. Once joined the control unit 1 can be separated from the gas cap vehicle interface unit 4 by pulling back on the retention clips 7 elastically deforming the clip arms. Once the retention clips 7 are no longer covering the compatible gas cap vehicle interface unit 4 it can be positioned similar to what is depicted in FIG. 3. When connecting the compatible gas cap vehicle interface unit 4 and the control unit 1 by means of the retention clips 7 and 8, the pressure transfer tube 12 can be bent in such a way that it rests within the pressure transfer tube cavity 13 when the control unit 1 and the gas cap vehicle interface unit 4 are connected.

Figure 4:
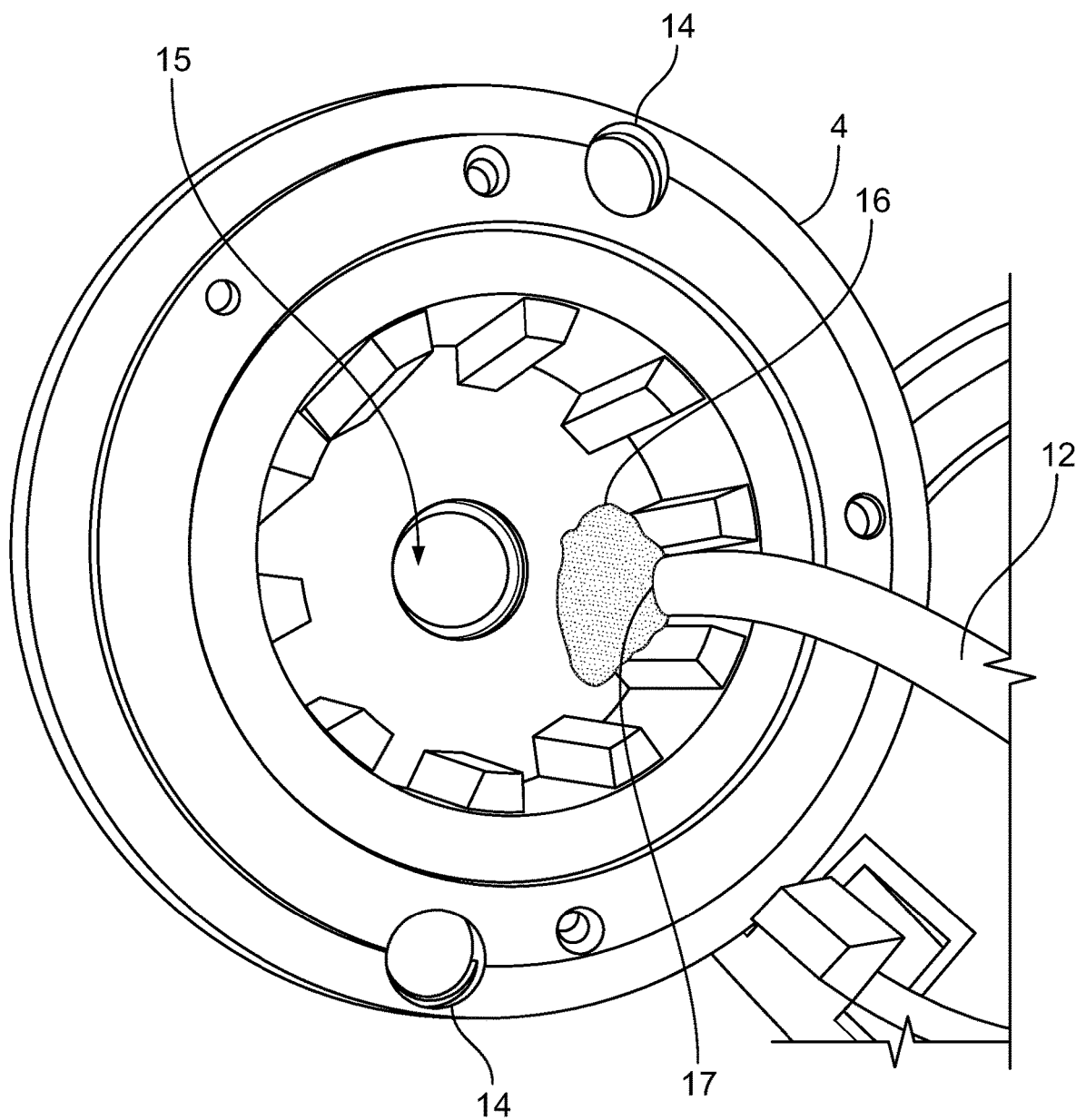
FIG. 4 is a top view of the compatible gas cap vehicle interface device side interior showing an airtight seal for the connection of the pressure transfer tube over the pressure bypass port.

FIG. 4 shows the inside of the compatible gas cap vehicle interface unit 4. The rotation pin matting holes 14 are aligned with the rotation pins 8 when assembling the device. An adhesive is one way to create an airtight seal 16 for the pressure transfer tube 12 over the pressure bypass port 17. This ensures the integrity of the compatible gas cap vehicle interface unit 4. If an airtight seal is not provided the device will not work as expected an air leak will affect pressure readings. In addition if an airtight seal is not provided the emergency pressure release valve 15 could potentially fail to trigger as the gas tank pressure will be combined with outside ambient pressure due to the air leak. The airtight seal 16 ensures the pressure transfer tube 12 can safely connect to the control unit 1 for data collection.

Figure 5:
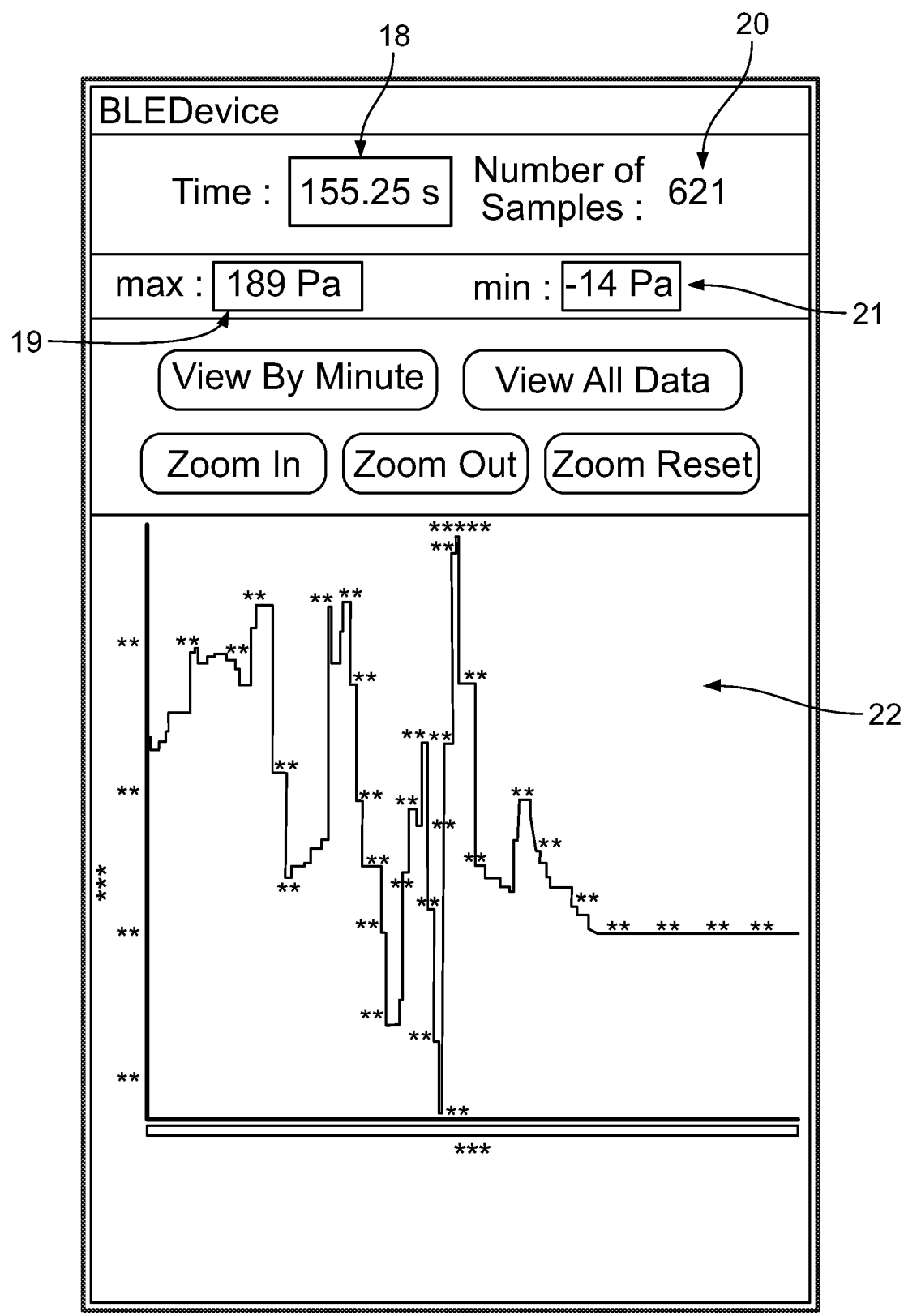
FIG. 5 is a sample of readings using a program designed to be compatible with the device.

FIG. 5 shows a sample of data recording using a compatible software application in use during a testing cycle. Once the automotive technician has completed a wireless connecting pairing his chosen enable wireless device and the EVAP testing device is properly installed on the desired vehicle, the provided control unit 1 with appropriate software can begin recording data. The sample shown indicates a maximum pressure 19, minimum pressure 21, the elapsed test time 18, and the number of test samples 20. These values fluctuate live as data is being recorded and is depicted in the view window 22. From here an automotive tech, barring they are operating the vehicle, can look at the data stream live and immediately determine once the vehicles EVAP self-test system if the EVAP system is properly holding a vacuum.

Figure 6:
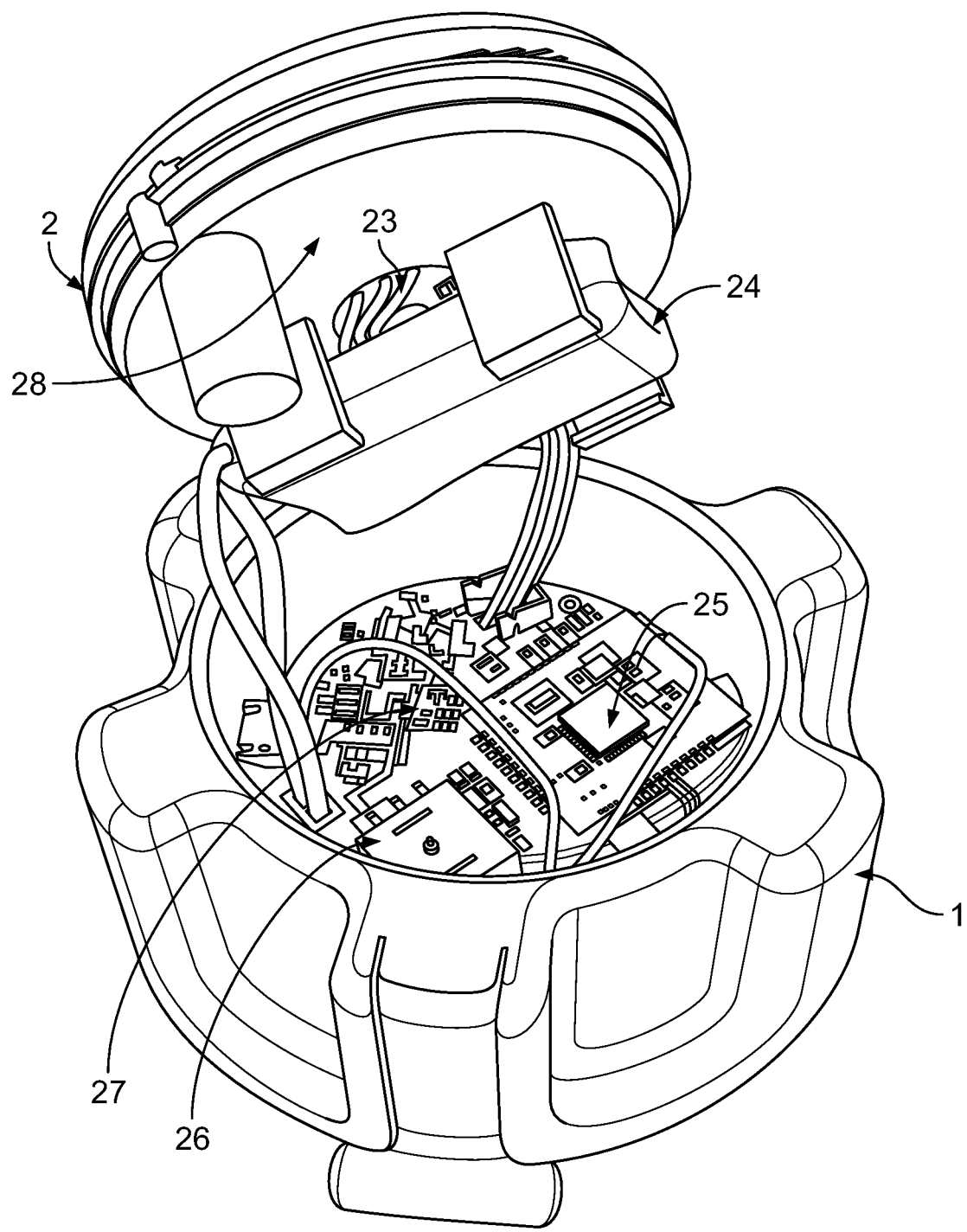
FIG. 6 is a view of the electronic components within the device.

FIG. 6 shows one embodiment of the internals of the control unit 1. An upper control unit housing 28 includes a power switch, such as a button, with an associated power indicating light, such as an LED, and a wiring 23. During operation the power light can be seen through the transparent acrylic top layer 2. A rechargeable battery 24 is provided within the control unit 1. This rechargeable battery 24 provides power to the power light, the primary control board 27, the pressure sensor module 26, and the wireless module 25.

In one embodiment an EVAP testing device comprises: a control unit; a pressure sensor module within the control unit; a gas cap vehicle interface unit with an upper section designed to be connected to the control unit, and a lower section designed to be inserted into a gas tank; a pressure bypass port in the lower section of the gas cap vehicle interface unit; a pressure transfer tube with two ends wherein one end is connected to the pressure bypass port and a second end is connected to the pressure sensor module; and an airtight seal at each of the two ends of the pressure bypass tube.

In another embodiment the EVAP testing device, the control unit further comprises a primary control board and a wireless module and the gas cap vehicle interface unit is created to be recessed into the control unit. A further embodiments may include a power switch and associated power light in an upper control unit housing 28, and a transparent top on the upper control unit housing 28.

In another embodiment the EVAP testing device, the control unit has pins created for insertion into compatible pin mating holes in the gas cap vehicle interface unit. in another embodiment the control unit is designed to be inserted into a recessed area in the gas cap vehicle interface unit. Either the control unit or the gas cap vehicle interface unit can be designed to inserted in the other.

The EVAP testing device can also be designed without a wireless transmission module 25. Instead a port for connection of a wire for transmission can be provided.

In another embodiment the Evap testing device is has at least one retaining clip 7 designed to support screwing the gas cap vehicle interface unit into a gas tank.

In another embodiment the control unit and gas cap vehicle interface are designed and created as a single unit. In this embodiment the single combined unit is designed to fit particular vehicles with different combined units created for different vehicles. The pressure transfer tube 12 can designed as an internal channel from the pressure bypass port 17 to the pressure sensor module 26.

The above is a detailed description of particular embodiments of the invention. It is recognized that departures from the disclosed embodiments may be made within the scope of the invention and that obvious modifications will occur to a person skilled in the art. Those skilled in the art should, in light of the present disclosure, appreciate that many changes can be made in the specific embodiments which are disclosed herein and still obtain a like or similar result without departing from the spirit and scope of the invention. All of the embodiments disclosed and claimed herein can be made and executed without undue experimentation in light of the present disclosure.

We claim:

1. An EVAP testing device comprising:
   a control unit;
   a pressure sensor module within the control unit;
   a gas cap vehicle interface unit designed to be connected to the control unit and designed to be inserted into a gas tank receptacle;
   a pressure bypass port in a bottom of the gas cap vehicle interface unit;

a pressure transfer tube with two ends wherein one end is connected to the pressure bypass port and a second end is connected to the pressure sensor module;

and an airtight seal at each of the two ends of the pressure transfer tube.

2. An EVAP testing device according to claim 1 wherein the control unit further comprises a primary control board and a wireless module.

3. An EVAP testing device according to claim 2 wherein the gas cap vehicle interface unit is created to be recessed into the control unit.

4. An EVAP testing device according to claim 3 wherein the control unit has pins created for insertion into compatible pin mating holes in the gas cap vehicle interface unit.

5. An EVAP testing device according to claim 2 further comprising at least one retaining clip securing the control unit to the gas cap vehicle interface unit.

6. An EVAP testing device according to claim 5 wherein the at least one retaining clip is designed to support screwing the gas cap vehicle interface unit into a gas tank.

7. An EVAP testing device according to claim 2 further comprising a power switch and associated power light located in an upper control unit housing of the control unit.

8. An EVAP testing device according to claim 7 further comprising a rechargeable battery.

9. An EVAP testing device according to claim 8 wherein the gas cap vehicle interface unit is created to be recessed into the control unit and secured utilizing at least one retaining clip.

10. An EVAP testing device according to claim 9 wherein the control unit has pins created for insertion into compatible pin mating holes in the gas cap vehicle interface unit.

11. An EVAP testing device according to claim 8 wherein the control unit has grips and the at least one retaining clip which is designed to support screwing the gas cap vehicle interface unit into a gas tank.

12. An EVAP testing device according to claim 8 wherein the upper control unit housing includes a transparent top.

13. An EVAP testing device according to claim 8 further comprising a pressure release valve in the gas cap vehicle interface unit.

* * * * *